(12) United States Patent
Torres Junco et al.

(10) Patent No.: US 8,641,893 B2
(45) Date of Patent: Feb. 4, 2014

(54) FLOATING CELL AND ISLAND WITH A FLOATING MACROPHYTE FILTER

(75) Inventors: Vicente Juan Torres Junco, Madrid (ES); Javier Riesco Prieto, Madrid (ES); Maria Lourdes Gacho Conde, legal representative, Madrid (ES); Pablo Riesco Prieto, Madrid (ES)

(73) Assignee: Macrofitas, S.L., Madrid (ES)

( * ) Notice: Subject to any disclaimer, the term of this patent is extended or adjusted under 35 U.S.C. 154(b) by 424 days.

(21) Appl. No.: 12/994,047

(22) PCT Filed: May 23, 2008

(86) PCT No.: PCT/ES2008/000370
§ 371 (c)(1),
(2), (4) Date: Aug. 30, 2011

(87) PCT Pub. No.: WO2009/141463
PCT Pub. Date: Nov. 26, 2009

(65) Prior Publication Data
US 2012/0012516 A1  Jan. 19, 2012

(51) Int. Cl.
| | |
|---|---|
| *C02F 3/32* | (2006.01) |
| *A01G 31/02* | (2006.01) |
| *C02F 3/30* | (2006.01) |
| *C02F 101/16* | (2006.01) |
| *C02F 103/00* | (2006.01) |

(52) U.S. Cl.
CPC .............. *C02F 3/327* (2013.01); *C02F 3/302* (2013.01); *C02F 2101/16* (2013.01); *C02F 2103/007* (2013.01); *A01G 31/02* (2013.01)
USPC .............. 210/170.05; 210/170.09; 210/170.1; 210/242.1; 210/602; 47/59 R; 47/66.5; 405/52

(58) Field of Classification Search
USPC ......... 210/170.05, 170.09, 170.1, 242.1, 602; 210/747.6; 47/59 R, 60, 63, 65.5, 66.5; 405/52, 195.1
See application file for complete search history.

(56) References Cited

U.S. PATENT DOCUMENTS

| | | | | |
|---|---|---|---|---|
| 3,385,786 | A * | 5/1968 | Klock | 210/602 |
| 4,536,988 | A * | 8/1985 | Hogen | 47/59 R |
| 5,096,577 | A | 3/1992 | Ngo et al. | |
| 5,228,229 | A * | 7/1993 | Lindgren | 47/60 |
| 5,437,786 | A | 8/1995 | Horsley et al. | |
| 5,766,474 | A * | 6/1998 | Smith et al. | 210/602 |
| 5,836,108 | A * | 11/1998 | Scheuer | 47/65.5 |
| 6,322,699 | B1 | 11/2001 | Fernandez | |
| 6,751,903 | B2 * | 6/2004 | Shryock | 47/59 R |

(Continued)

FOREIGN PATENT DOCUMENTS

| | | |
|---|---|---|
| ES | 2074159 | 9/1995 |
| ES | 2120388 | 10/1998 |
| JP | 63-209795 | 8/1988 |
| JP | 09-029283 | 2/1997 |
| WO | 9626906 | 9/1996 |

*Primary Examiner* — Christopher Upton
(74) *Attorney, Agent, or Firm* — Lowe Hauptman & Ham, LLP

(57) ABSTRACT

A floating cell with a floating macrophyte filter that can be installed in a chamber containing a volume of fluid to be filtered. The cell has: a layer with a floating macrophyte filter between a perimeter and a centre of the island; supporting means with peripheral structural means for defining a periphery; internal structural means for defining a framework; a central node; peripheral connecting means; internal connecting means; central flotation means and peripheral flotation means.

10 Claims, 2 Drawing Sheets

(56) References Cited

U.S. PATENT DOCUMENTS

| | | |
|---|---|---|
| 7,776,216 B1 * | 8/2010 | Jensen et al. .............. 210/170.05 |
| 2005/0183331 A1 * | 8/2005 | Kania et al. .................... 47/65.5 |
| 2005/0274073 A1 * | 12/2005 | Brooke et al. ................. 47/59 R |
| 2006/0243659 A1 * | 11/2006 | Svirklys et al. ............... 210/602 |
| 2009/0250393 A1 * | 10/2009 | Williams ................. 210/170.09 |

* cited by examiner

FLOATING CELL AND ISLAND WITH A FLOATING MACROPHYTE FILTER

RELATED APPLICATIONS

The present application is based on, and claims priority from, International Application Number PCT/ES2008/000370, filed May 23, 2008, the disclosure of which is hereby incorporated by reference herein in its entirety.

FIELD OF THE INVENTION

The invention relates to a floating cell with a floating macrophyte filter. It also relates to an island formed by the combination of several cells.

BACKGROUND OF THE INVENTION

The invention considers making a floating island that works as a natural ecosystem on the surface of the water. The applicant does not know of antecedents related to the invention.

DESCRIPTION OF THE INVENTION

The floating island makes the most of one of the great advantages of the Floating Macrophyte Filter (FMF) over other treatment techniques based on macrophytes, since the buoyancy of the macrophytes allows for floating surfaces and if the warp is hard-wearing (reinforced interior) and durable (non-degradable over time), these turn out to be stable for many years.

Taking into account that said weft (roots and rhizomes) is continuously replacing and renewing itself, it enables the plant mass that forms the island to keep afloat and alive, as if they were growing in natural terrain.

The invention also relates to the process for treating expanses of waters polluted by ammoniums, nitrates, organic matter, heavy metals and other pollutants through the formation of floating macrophyte islands/ponds waterproofed from outside water. Water from the cold bottom (hypolimnion) rich in ammoniums and anoxia (low oxygen $O_2$ content) can be taken to transfer the water to the pond to be distributed by the root system of the floating macrophytes, which provide the oxygen necessary to produce nitrification and after to conduct the water back to the anoxic zone where denitrification occurs, the reduction of the BOD (Biological Oxygen Demand); the reduction of the COD (Chemical Oxygen Demand); the reduction of heavy metals and other pollutant substances.

Water can also be taken from the surface layer (epilimnion) to send the nitrified water to the bottom for its denitrification.

The island/pond may have, above the water line, specially prepared surfaces, that allow cultivation of protected and ornamental plant species between the macrophytes, refuges, resting places/bedding, both for aquatic animals as well as for birds, which are appealing for nesting and breeding.

One aspect of the invention relates to a floating cell with a floating macrophyte filter that can be installed in a chamber containing a volume of fluid to be filtered. The cell comprises:
a layer with a floating macrophyte filter between a perimeter and a centre of the island that can filter a flow filtration;
supporting means comprising:
peripheral structural means comprising a plurality of peripheral girders that can define a perimeter;
internal structural means comprising a plurality of radial girders and internal girders that can define a framework;
a central node to define a central cavity comprising a plurality of central connecting means that can connect the central node with a first end section of radial girders;
peripheral connecting means that can connect peripheral girders together at each end and peripheral girders at one end with a second end section of radial girders;
internal connecting means that can connect internal girders together at each end, internal girders at one end with peripheral girders at a intermediate point and internal girders at one end with radial girders at an intermediate point;
flotation means comprising:
central flotation means comprising a plurality of central floats enclosed inside the central cavity;
peripheral flotation means comprising a plurality of peripheral floats connected to the peripheral girders.

The floating cell may further comprise:
containment means to limit a volume of fluid lying under the cell comprising:
a waterproof sheet connected to the peripheral girders;
inlet means that can receive an influent, a flow of fluid to be filtered;
outlet means that can evacuate an effluent, a filtered flow of fluid;
inlet conduit means connected to the inlet means to conduct the influent inside the waterproof sheet;
outlet conduit means connected to the outlet means to conduct the effluent outside the waterproof sheet;
discharge means to drive the influent, the flow filtration and the effluent;
The outlet conduit means that can conduct the effluent to a deep level in the chamber.
The inlet conduit means that can conduct the influent to a selected level
between a deep level in the chamber and a surface level in the chamber.
The discharge means may be located at the peripheral connecting means.
The peripheral floats may be polyethylene pipes sealed at both ends.
The central floats may be drums sealed at both ends.
The floating cell may further comprise anchoring means for anchoring the cell to a fixed point.
The floating cell may further comprise access means that define a gangway to connect the perimeter to the centre.
Another aspect of the invention relates to an island which may comprise a plurality of floating cells with a floating macrophyte filter. The island may comprise connection means that can connect one cell to another adjacent cell by the peripheral connecting means.

BRIEF DESCRIPTION OF THE DRAWINGS

Described very briefly hereinafter are a series of drawings that help to better understand the invention and which are expressly related to an embodiment of said invention that is presented as a non-limiting example thereof.

DESCRIPTION OF A PREFERRED EMBODIMENT OF THE INVENTION

Figure 1:
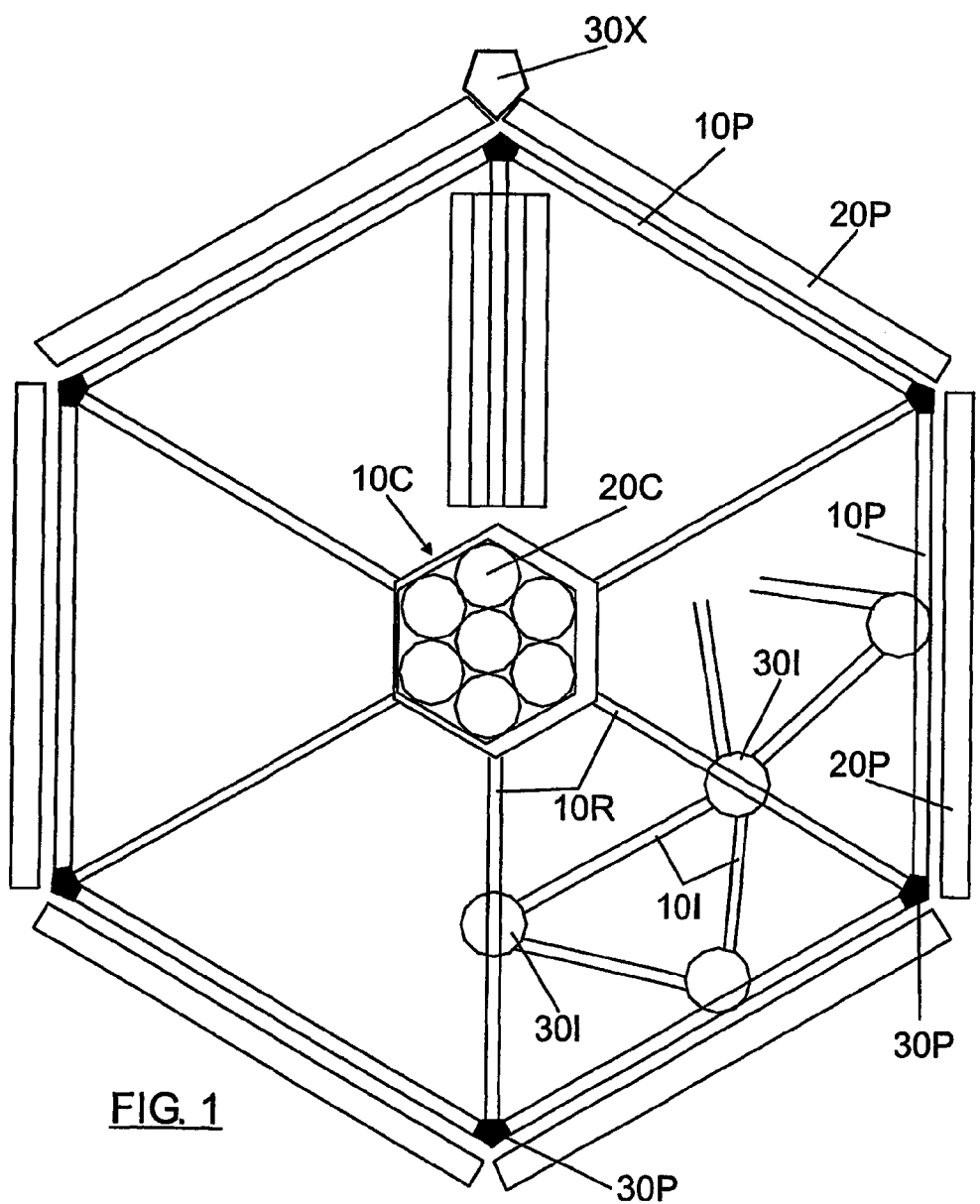
FIG. 1 is a plan view of a cell of the invention.
Figure 2:
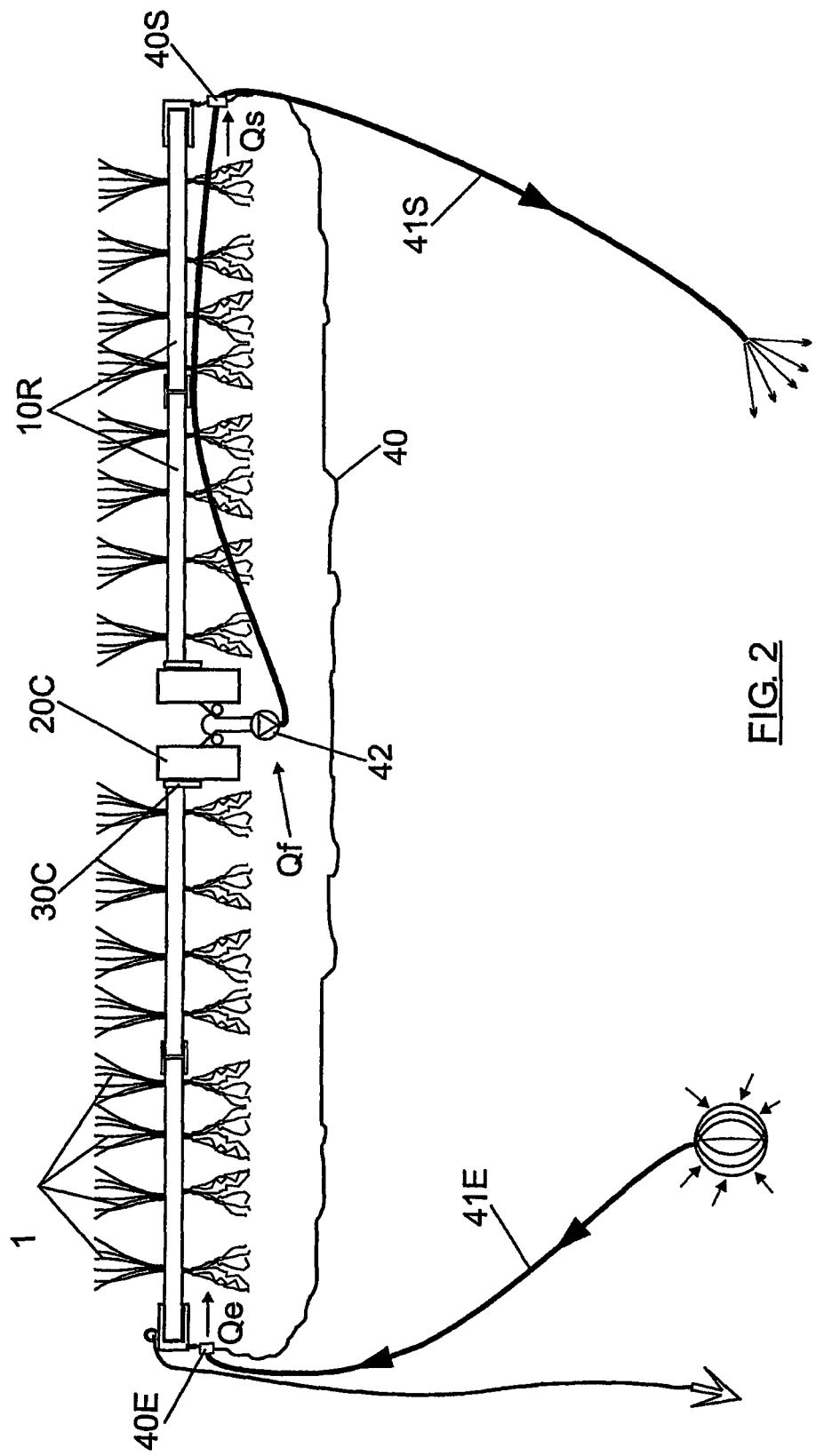
FIG. 2 is a section of a cell of the invention.

The behaviour of impounded waters is stratified into three layers or very stable and differentiated areas of waters and can be summarized in the following manner:

1. A warmer first layer or surface level (Epilimnion) with oxygen (due to atmospheric exchange and the photosynthetic activity of phytoplankton),
2. A transitional intermediate layer (thermocline),
3. A lower layer or deep, cold and anoxic (hypolimnion) level where the reduced species such as the case of ammonium, $NH_4^+$ predominate.

These layers do not mix and remain independent.

A normal situation allows taking 15 mg/l of ammonium, $NH_4^+$ at the bottom of the reservoir where the water intake is laid, as initial data.

Concentration in the hypolimnion of 15 mg/l $NH_4^+$ (bottom of reservoir).
Flow rate: 10 l/s.
Volume of water fed into the island a day, 86.4 m3/per day
Nitrification capacity of macrophytes 120 g/m2/per day.
Depth reached by the root system, within the island, 0.7 m.
For this concentration and flow 108 m2 would be required.
Volume of water contained within the island, 108*0.7=75.6 m3.
Residence time: 75.6/86.4=0.875 days; retention time in the pond may be variable on being dependent on this, the pump flow and the latter being dependent on the type of pollutant and the percentage one wishes to eliminate therefrom.
It will only depend on the pump discharge capacity.
Water temperature: 15° C.
Outlined hereinafter are some design specifications.

In order to carry out the premise of the removal of amoniacal nitrogen a polyethylene (PE) sheet with a thickness=1 mm, flexible and easy to handle is used, to isolate the rhizomatic system in the reservoir water and only the bottom water transfers to the FMF.

The waterproof sheet can be inflated by air or product enabling it to act like an inflatable mattress, if required.

If it is necessary to use the geo-textile to reinforce the waterproof sheet, it will be secured to turnbuckles and these are secured to the outer peripheral support of the island and/or to the cell structures of the island grids, such that the sheet is reinforced within the cell grids, if necessary, to transmit the dynamic requirements of the assembly to the resistant structure.

The waterproof sheet is positioned or is extended under the resistant support structure of the island/pond, such that it forms the closure of the pond catchall, securing it to supports prepared for this purpose, so the connection does not transmit major structural force to the sheet, due to the height difference between the water contained in the FMF catchall and the level of water outside.

The sheet works by compression, when the water in the FMF catchall is higher than the water in the reservoir or less than this by the effect that the pump produces inside the pond, as this pumps water inside the island/pond or removes it therefrom or by the waterproof sheet not having sufficient clearance and the submerged part of the macrophytes impacting thereon. Three situations occur depending on the height of the water on the inside of the island/pond with respect to the water level on the free surface where the island/pond floats.

A) The Height of the Water on the Interior of the Island/Pond is Higher than that of the Reservoir:

The waterproof sheet may be inflatable, or may rest on another that forms a floating surface that supports it when the waterproof sheet may put pressure on it due to the weight it has to bear because of the difference in heights between the water in the pond and that of the reservoir. That sheet is inflatable or the clearance of the sheet with respect to the surface of the island/pond allows for varying of the distance between the sheet and the rhizomatic system in order to achieve purification of the water on the interior of the island/pond such that the water receives the benefits from the macrophyte rhizomatic and root system.

The difference in surfaces enables the adequate volume of water within the island/pond to be obtained so that the expected treatment is produced therein. In this way, continuous operation of the treatment system is achieved, in accordance with the design specifications:

$$\text{where: } V = S \times h$$

V=Volume
S=Island/pond surface
h=Depth $$h = (SI - S)/P$$

where:
SI=sheet surfaces
P=island/pond perimeter
with the macrophytes remaining attached or detached from the sheet at a distance so that the submerged system may treat the water on the interior of the island/pond.

B) The Water in the Reservoir is Higher than that of the Water in the Island/Pond, Caused by the Effect of the Pump that Extracts the Water from Interior of the Island/Pond:

The water-resistant sheet of the island/pond is forced to rise to the surface by the water pressure in the reservoir until it reaches the submerged part of the macrophytes; these are settled on the waterproof sheet and prevent the rise because of the weight transmitted thereto, thus forming the purifying filter.

When the purifying filter does not touch the waterproof sheet, brace caps are fitted to the structure of the pond that reach the desired depth or a material denser than water, which prevents the waterproof sheet from rising and that will be limited by the volume that allows it the clearance or difference between the surface of the island/raft and that of the waterproof sheet is put on top of the waterproof sheet.

The volume or depth of the island/pond is achieved by controlling the sheets positioned at the bottom of the floating structures, varying the density of the sheet or by the clearance thereof with respect to the surface of the island/pond, such that it allows the submerged macrophyte system to position it in the designed position with respect to the sheet, so that the water that passes through the purifying filter benefits from the macrophyte rhizomatic and root system.

The resistant structure of the pond and that of the waterproof sheet (inflatable or not), allows for construction and assembly on the lakeshore, in water or in a deep area.

C) The Water Level on the Interior of the Island/Pond is the Same as that on the Outside:

The island/pond does not have a closed perimeter. The water is directly in contact with the macrophyte purifying filter. Suspended areas on the structure of the Island can be placed under the filter that have a surface equipped for spawning of fish. The anchoring system of the island allows it to be displaced by the surface of the water, sweeping a predetermined area and treating the surface layers of the water.

The components of the structure of the cell/island are described hereinafter.

Floating Base Structure:

The initial floating structure is made by using closed or sealed PVC or PE pipes, or by using another material that floats, such as wood, polyethylene, forming a triangular or quadrangular or hexagonal or polygonal-shaped harness, any that floats and distributes or absorbs the strains, allowing installation of the waterproof sheet, reinforced or not by geo-textile under this.

The floating structure is achieved by connecting the girders, planks and pipes by using elbows, crosses, T-pieces or special fittings. The pieces that require it are closed internally, such that if a break occurs only the damaged section is unused and the rest of the floating structure is not affected, not transferring the flood to the rest of the structure and it always bears its own weight and that of the water it contains on its interior, which is higher than that outside the island/pond.

The enclosure perimeter can stand out from the water, sufficiently high so that under normal conditions it prevents water on the outside from passing to the inside of the island/pond, if this is required. The enclosure perimeter has to offset the forces caused by the differences in height between the water on the inside and the water on the outside. The enclosure perimeter houses special areas, such as flow tubes, which allow feeding outside water from the bottom of the reservoir to its interior or from the interior to the outside of the island/pond.

The waterproof sheet is secured to the floating peripheral structure of the island/pond, isolating it from the outside water.

Once closure of the island/pond is completed, it can be filled with water and the waterproof sheet, which is the base of the island, will sink once the difference in height between the levels of interior and exterior water is increased, due to the effect of the increase in the hydraulic height within the perimeter of the island/pond. Once the sheet has been sunk to the designed depth, one can proceed to the planting of the macrophytes of the island/pond.

The clearance of the peripheral surface of the sheet with respect to that of the island will be 1.25 m in length along the entire enclosure perimeter, such as to enable the development of the macrophyte rhizomatic and root system installed on the island, without these transmitting heavy weight loads to the sheet through resting or sitting on the sheet.

In the gaps of the geometric square or hexagonal, or other, island structure, if required, a St. Andrew's cross is included to distribute and absorb the transversal forces occurring inside the island or transmitted by the wind water or by maintenance activities or by animals. The surface spawning areas are connected to the floating structure or to the reinforcements at the Saint Andrew's Cross by clamps, turnbuckles or other connecting means, such that stable surfaces, suitable for spawning, are formed.

Waterproof Sheet.

The waterproof sheet will preferably be made of highly water-resistant material, such as PE, with adequate thickness that does not tear or puncture through dynamic actions transmitted by the macrophytes, water or human or animal activities, both on the interior as well as on the exterior thereof.

The connection of the waterproof sheet to the edge of the pond is carried out by means of welding or tying to the pipe or enclosure perimeter, making the connection in places that stand out from the water, for example on the upper part of the PE Ø 250 pipes and leaving a surface clearance of 1.25 m. in length along the entire enclosure perimeter.

Edge of Pond

Once the floating structure of the pond has been assembled with its geo-textile and waterproof sheet, if required, one can proceed to the assembly of enclosure perimeter using a corrugated PE Ø 250 mm pipe. The PE sheet is welded to the Ø 250 enclosure pipe by the upper emerged part, with the welded arc spanning a half diameter. Once the whole structure is floating one can then proceed to tie the resistant structure to the closed perimeter pipe, by using six-ply PE cords, passing them through the gap or PE pipe channels at distances not exceeding 60 cm.

Anchors

The anchor has the technical characteristics of a marine anchor, which ensures anchoring at the bottom and release from the bottom when raised.

The anchor is connected to a cable, rope or chain and this is connected to the floating structure, by swivel parts to prevent "torsions" buckling with the structure of the pond or with the anchor.

The anchor is made from materials that do not pollute the water through oxidation or dilution.

Planting FMF. The type of plants will be the macrophyte variety present in the area, or in the neighbouring basins, such that their biological diversity forms a natural riverside habitat.

With the pond filled with water, one can proceed to the planting of the same, by using technique of spirals and ASS (Assembly Support Structure) parts.

Motivations that determine the invention.

Macrophytes are among the plant species that have the largest biomass productivity reached per $m^2$: wheat 2 kg, maize 3 kg; macrophytes of reed-mace or typha produce 6 $kg/m^2$ and can absorb nitrates from the water 3.7-5.8 $g/m^2$/per day in order to meet their biological needs.

Macrophytes have the property of injecting or transferring oxygen from the air which is in contact with its leaves and expelling it from the submerged parts to the water, especially through its rhizomatic system to the water, to prevent eutrophication thereof.

The amount of oxygen delivered to the water is proportional to the degree of eutrophication the water presents.

Based on this property it is confirmed that the removals achieved and contrasted for more than 10 years by the macrophytes in the lakes or ponds are 17 g of $NH_4^+/m^2$ in the FMF's carried out in canals.

In the FMF's installed within the extended aeration conventional filter system reactors, the removals are extremely high exceeding more than 120 $g/m^2$/per day (the macrophytes oxidize the ammoniums, nitrifying them and on entering the anoxic areas of the Wastewater Treatment Plant (WWTP) they are denitrified, passing the nitrogen to its gaseous form, escaping or releasing it into the air).

To increase the removal power, it is therefore necessary to pass the water containing ammoniums through the FMF and after conduct it to the anoxic area. This operation is very simple to carry out in the FMF on an isolated floating island.

Flow of Water in the FMF.

The inlet flow (influent) and outlet flow (effluent) of water from the FMF system will be different, depending on the form the dissolved nitrogen has in the water:

A) Shallow or surface waters with dissolved nitrogen in the form of aminos: water enters the FMF through the edge of the pond or through the bottom and its effluent is achieved via a pumping system, channelling it and returning it to the reservoir in deep (anoxic) areas.

It is necessary that the FMF system is on an Island/pond.

B) Deep waters with nitrates: the influent is taken from deep areas and is channelled directly to the floating pond: by using a pump, it is passed through the FMF which oxidizes the ammoniums (nitrification) and the effluent water is channelled back to the bottom, by using the hydrostatic height difference that produces the influent inlet form, between the water from the reservoir and the water level of the pond, the effluent is channelled to a deep area for denitrification.

It is necessary that the FMF system is on an Island/pond.

C) Waters with ammoniums in deep and shallow areas: in this case the FMF is directly bathed or submerged in the water from the reservoir, so it does not have the FMF on an isolated pond; surface currents produced by the wind or movements of the pond around its anchor system are those that generate the influent and effluent effect.

The island does not have to be a pond, with pumps and channelling of its influents and effluents not being necessary.

The treatment process by means of an Island/pond is self-sustaining.

Only the water discharge pump consumes energy and this can feed itself from the solar panel installed on the actual Island/pond or on its periphery.

The pump is protected by means of a cage to prevent it from being easily removed.

The pump and its protection are submerged and supported by an appropriate float which is installed on its own on the edge of the Island/pond or on the interior thereof.

Channelling the electric power cable is carried out using a flexible, watertight and floating tube.

The electric power cables are reinforced "against rodents".

The electrical panels are prepared to deal with flooding, with circuit-breaker, thermal, engine guard, power surge protection and the type of protection required by the site.

For greater ease of implementation, any of the closed casings presented in a reservoir can also be used and try to plant the FMF thereon in the same manner it would be carried out on a pond, i.e. without complex floating structures like floating separate islands, but taking advantage of a natural enclosure of the casing and enclose the FMF only on one side to prevent it from leaving the enclosed area, making the water that is to be treated pass through it.

This way it is planted with the ASS spiral structures and with lateral fixing in the area open to the rest of the reservoir. This greatly simplifies its implementation and construction cost savings allows for investment of a larger budget in $m^2$ of installation in order to achieve even better results in the nitrification process. For an estimated surface of 3,000 $m^2$, and taking the data of the removals obtained of extended aeration in treatment plants with anoxic areas, reductions of 120 g/$m^2$/per day are achieved and by using a pump that delivers approximately some 10 l/s (36 $m^3$/hour-864 $m^3$/day) the degree of nitrification expected is:

$$864,000 \text{ l/day} \times 15 \text{ mg/l of NH}_4^+ = 0.015 \times 864000 = 12.960 \text{ g NH}_4^+/\text{day}$$

$$\text{Elimination: } 3,000 \text{ m2} \times 120 \text{ g of NH}_4^+/\text{m}^2 = 360,000 \text{ g/day}$$

One embodiment of the invention relates to a floating cell with a floating macrophyte filter that can be installed in a chamber containing a volume of fluid to be filtered. The cell comprises:

a layer with a floating macrophyte filter (1) between a perimeter and a centre of the island that can filter a flow filtration;
supporting means comprising:
peripheral structural means comprising a plurality of peripheral girders (10P) that can define a perimeter;
internal structural means comprising a plurality of radial girders (10R) and internal girders (10I) that can define a framework;
a central node (10C) to define a central cavity comprising a plurality of central connecting means (30C) that can connect the central node (10C) with a first end section of radial girders (10R);
peripheral connecting means (30P) that can connect peripheral girders (10P) together at each end and peripheral girders (10P) at one end with a second end section of radial girders (10R);
internal connecting means (30I) that can connect internal girders (10I) together at each end, internal girders (10I) at one end with peripheral girders (10P) at a intermediate point and internal girders (10I) at one end with radial girders (10R) at an intermediate point; flotation means comprising:
central flotation means comprising a plurality of central floats (20C) enclosed inside the central cavity;
peripheral flotation means comprising a plurality of periphery floats (20P) connected to the peripheral girders (10P).

The floating cell further comprises:
containment means to limit a volume of fluid lying under the cell comprising:
a waterproof sheet (40) connected to the peripheral girders (10P);
inlet means (40E) that can receive an influent, a flow of fluid to be filtered; outlet means (40S) that can evacuate an effluent, a filtered flow of fluid (Qs);
inlet conduit means (41E) connected to the inlet means (40E) to lead the influent (Qe) inside the waterproof layer (40);
outlet conduit means (41S) connected to the outlet means to (40S) to lead the effluent (Qs) outside the waterproof sheet (40);
discharge means (42) to drive the influent flow (Qe), the flow filtration (Qf) and the effluent (Qs);

The outlet conduit means (41S) can lead the effluent (Qs) to a deep level in the chamber.

The inlet conduit means (41E) can lead the influent (Qe) to a selected level between a deep level in the chamber and a surface level in the chamber.

The discharge means (42) are located at the peripheral connecting means (30P).

The peripheral floats (20P) are polyethylene pipes sealed at both ends.

The central floats (20C) are drums sealed at both ends. The floating cell further comprises anchoring (110) means for anchoring the cell to a fixed point.

The floating cell further comprises access means (110) that define a gangway for connecting the perimeter to the centre.

Another embodiment of the invention relates to an island comprising a plurality of floating cells with a floating macrophyte filter. The island comprises connection means (30X) that can connect one cell to another adjacent cell by the peripheral connecting means (30P).

The invention claimed is:

1. A floating cell with a floating macrophyte filter that can be installed in a chamber containing a volume of fluid to be filtered, the cell comprising:
a layer with a floating macrophyte filter between a perimeter and a centre of the island arranged to filter a flow filtration;
supporting means comprising:
peripheral structural means comprising a plurality of peripheral girders defining a perimeter;
internal structural means comprising a plurality of radial girders and internal girders defining a framework;
a central node to define a central cavity comprising a plurality of central connecting means connecting the central node with a first end section of radial girders;
peripheral connecting means connecting peripheral girders together at each end and peripheral girders at one end with a second end section of radial girders;

internal connecting means connecting internal girders together at each end, internal girders at one end with peripheral girders at a intermediate point and internal girders at one end with radial girders at an intermediate point;

flotation means comprising:

central flotation means comprising a plurality of central floats enclosed inside the central cavity;

peripheral flotation means comprising a plurality of peripheral floats connected to the peripheral girders.

2. A floating cell with a floating macrophyte filter in accordance with claim 1 further comprising:

containment means to limit a volume of fluid lying under the cell comprising:

a waterproof sheet connected to the peripheral girders;

inlet means arranged to receive an influent, a flow of fluid to be filtered;

outlet means arranged to evacuate an effluent, a filtered flow of fluid;

inlet conduit means connected to the inlet means to lead the influent inside the waterproof sheet;

outlet conduit means connected to the outlet means to lead the effluent outside the waterproof sheet;

discharge means to drive the influent, the flow filtration and the effluent.

3. A floating cell with a floating macrophyte filter in accordance with claim 2, the outlet conduit means arranged to lead the effluent to a deep level in the chamber.

4. A floating cell with a floating macrophyte filter in accordance with claim 2, the inlet conduit means arranged to lead the influent to a selected level between a deep level in the chamber and a surface level in the chamber.

5. A floating cell with a floating macrophyte filter in accordance with claim 2, the discharge means being located at the peripheral connecting means.

6. A floating cell with a floating macrophyte filter in accordance with claim 1, the peripheral floats being polyethylene pipes sealed at both ends.

7. A floating cell with a floating macrophyte filter in accordance with claim 1, the central floats being drums sealed at both ends.

8. A floating cell with a floating macrophyte filter in accordance with claim 1 further comprising anchoring means for anchoring the cell to a fixed point.

9. A floating cell with a floating macrophyte filter in accordance with claim 1, further comprising access means defining a gangway to connect the perimeter to the centre.

10. An island with a plurality of floating cells with a floating macrophyte filter in accordance with claim 1, comprising a connection means arranged to connect a cell with another adjacent cell by the peripheral connecting means.

* * * * *